United States Patent [19]
Fuke et al.

[11] Patent Number: 6,011,929
[45] Date of Patent: *Jan. 4, 2000

[54] FLASH APPARATUS CAPABLE OF VARYING EMISSION ANGLE

[75] Inventors: Mitsuo Fuke, Nara; Katsunori Kawabata, Osaka; Katsumi Horinishi, Hashimoto, all of Japan

[73] Assignee: West Electric Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,296

[22] Filed: Jul. 25, 1997

[30] Foreign Application Priority Data

Jul. 29, 1996 [JP] Japan .................................. 8-198733

[51] Int. Cl.[7] ............................ G03B 15/02; G03B 15/05
[52] U.S. Cl. ............................ 396/175; 396/200; 362/16; 362/18
[58] Field of Search ..................................... 396/155, 164, 396/175, 198, 200; 362/16, 18, 20

[56] References Cited

U.S. PATENT DOCUMENTS

| | | | |
|---|---|---|---|
| 5,050,044 | 9/1991 | Shibayama | 362/18 |
| 5,160,192 | 11/1992 | Sugawara | 362/16 |
| 5,486,886 | 1/1996 | Vaynshteyn | 362/18 |
| 5,641,218 | 6/1997 | Sakurai | 362/16 |
| 5,734,934 | 3/1998 | Horinishi et al. | 396/62 |

*Primary Examiner*—Safet Metjahic
*Assistant Examiner*—Michael Dalakis
*Attorney, Agent, or Firm*—Parkhurst & Wendel, L.L.P.

[57] ABSTRACT

A flash apparatus capable of varying the emission angle according to the present invention is characterized in that a light controller provided in front of a reflector for diffusing or condensing supplied light is configured to comprise a diffusion controlling portion having light diffusive action only with respect to a longitudinal direction of a bar-like light source and a condensation controlling portion having condensing action to omnidirectionally condense supplied light. By this, the flash apparatus capable of varying the emission angle can control and restrict prism action at the light controller by diffusing light emitted from the bar-like light source in respect to the longitudinal direction of the bar-like light source even when the bar-like light source and the light controller are close to each other. As a result, unevenness of light distribution (rainbow-like unevenness) based on the prism action at the light controller can be prevented from occurring even in a state on the wide side when the light emitting portion is miniaturized.

11 Claims, 11 Drawing Sheets

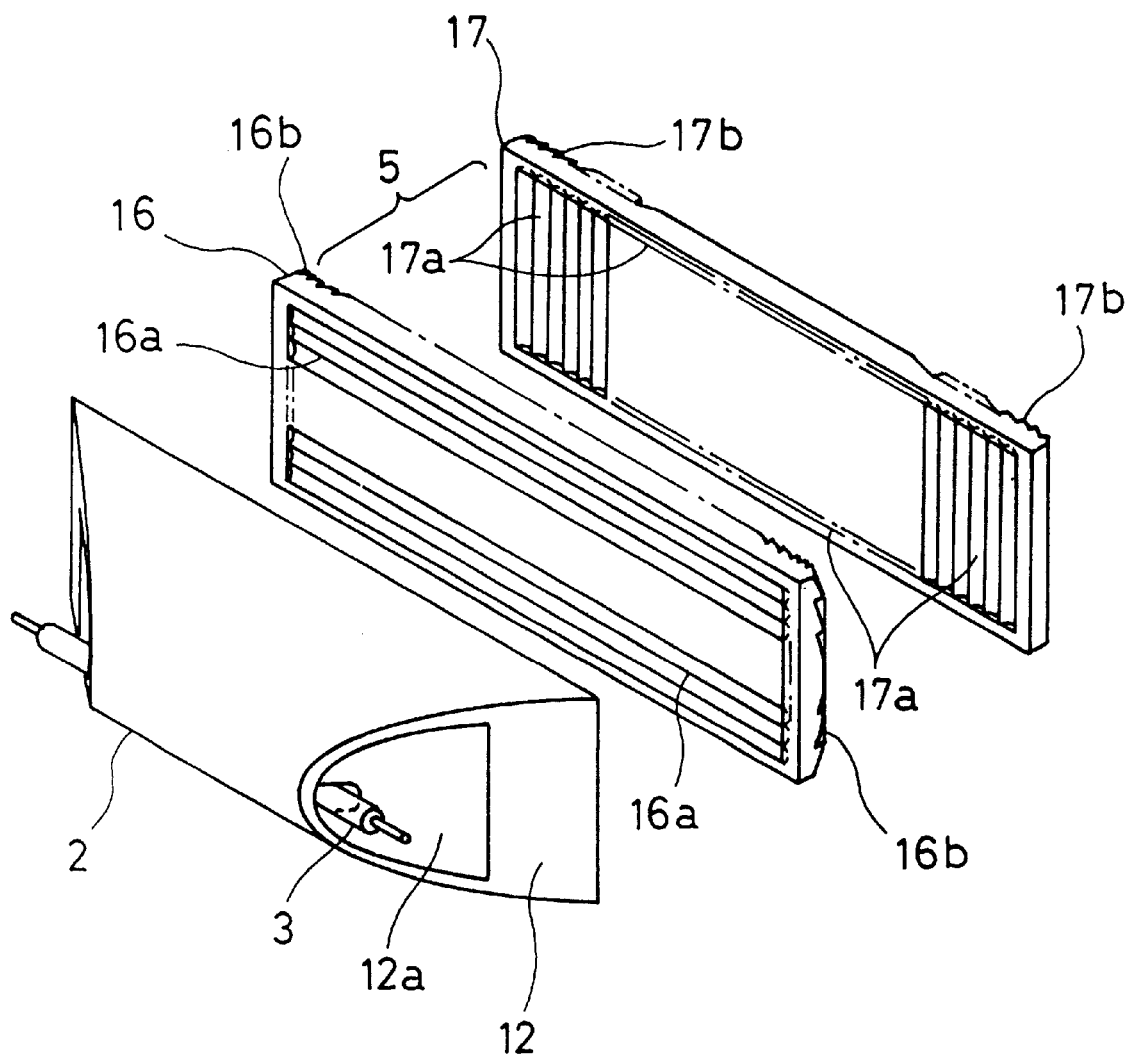

FIG. 10
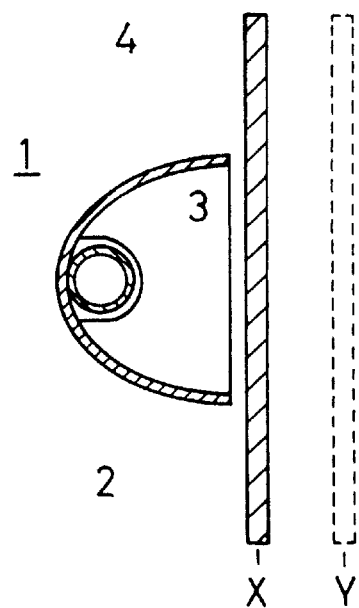
FIG.11A　　　　FIG.11B
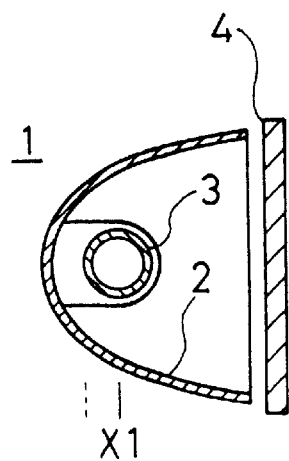 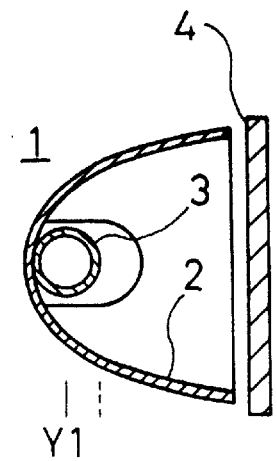

FLASH APPARATUS CAPABLE OF VARYING EMISSION ANGLE

FIELD OF THE INVENTION

The present invention relates to a flash apparatus capable of varying the emission angle of light emitted from a light emitting portion, and more particularly, to a flash apparatus capable of varying the emission angle which can prevent unevenness of light distribution that occurs when wide light emission angle is set.

BACKGROUND OF THE INVENTION

Conventionally, various kinds of what is called flash apparatus capable of varying the emission angle have been put to practical use or proposed which are configured to control the emission angle of light emitted from a light emitting portion comprising a flash discharge tube as a light source, a reflector, a Fresnel lens as an optical member, and the like according to the focal length of a photographing lens used for taking a photograph.

FIG. 10 is a partial schematic view of a conventionally well-known flash apparatus capable of varying the emission angle. The flash apparatus is capable of varying the emission angle by moving a Fresnel lens 4 disposed in front of a light emitting unit 1 comprising a reflector 2 and a flash discharge tube 3 disposed at the bottom of the reflector 2 as a light source from a position X shown with solid lines to a position Y shown with broken lines. It is to be noted that the opposite, that is, an apparatus configured to have the fixed Fresnel lens 4 and the movable light emitting unit 1 is also well-known (such as ones disclosed in Japanese Utility Model Application Laid-Open No. 53-62330 and Japanese Patent Application Laid-Open No. 60-83921).

FIGS. 11A and 11B are partial schematic views of another conventionally well-known flash apparatus capable of varying the emission angle. The flash apparatus is capable of varying the emission angle by changing the positional relationship of the flash discharge tube 3 with respect to the reflector 2 by way of moving the flash discharge tube 3 from a position X1 shown in FIG. 11A on the "wide" side to a position Y1 shown in FIG. 11B on the "telescopic" side (such as one disclosed in Japanese Patent Publication No. 62-51453).

However, conventional flash apparatus capable of varying the emission angle described in the above has the following disadvantages.

For example, with respect to the apparatus shown in FIG. 10 capable of varying the emission angle basically by changing the relative positional relationship between the light emitting unit 1 and the Fresnel lens 4, it is known that the amount of the relative movement of the two necessary to obtain the required change in the emission angle is relatively large compared with the amount of the movement of the reflector 2 or of the flash discharge tube 3 of the apparatus shown in FIGS. 11A and 11B capable of varying the emission angle by changing the positional relationship of the flash discharge tube 3 with respect to the reflector 2. Therefore, the apparatus basically has a disadvantage of becoming larger.

On the other hand, the one shown in FIGS. 11A and 11B is advantageous in that the apparatus can be miniaturized since the amount of movement of the flash discharge tube 3 necessary to obtain the required change in the emission angle can be made smaller than the amount of movement of the light emitting unit 1 and the like of the one shown in FIG. 10.

However, the light emitting portion typically comprises a combination of a bar-like light source as the flash discharge tube 3 and the Fresnel lens 4 as an optical member.

The Fresnel lens 4 is, as is known well, configured to be like a flat plate as a whole by dividing a curved face of a lens into concentric curved face portions and by connecting the divided curved face portions together at respective sections. The Fresnel lens 4 is manufactured by injection molding or press molding of a plastic material such as acrylic resin.

Therefore, when the light emitting portion is miniaturized and actually used in taking a photograph, thin lines of various colors (hereinafter referred to as rainbow-like unevenness) are generated at the longitudinal ends of a bar-like light source L as unevenness of light distribution.

FIG. 12 is a view illustrating a state of light incoming from a bar-like light source to a Fresnel lens and passing through the Fresnel lens and the like.

For example, a photograph was actually taken and developing and printing thereof were carried out with a specific example of the figure where a longitudinal width D of a reflector K is 35 mm, a distance D1 between the center of the bar-like light source L and the bottom of the reflector K is 6 mm, a distance D2 from the center of the bar-like light source L and a plane of incident light of a Fresnel lens F is 11 mm, a distance D3 between main electrodes of the bar-like light source L is 28 mm, and the focal length of the Fresnel lens F is 35 mm. The resultant photograph was observed to have rainbow-like unevenness in Z directions which are at about 30 degrees from the center of the Fresnel lens F to both longitudinal ends of the bar-like light source L with the direction right ahead of the Fresnel lens F being 0 degree.

The above-mentioned rainbow-like unevenness is assumed to occur because, since miniaturization of a light emitting portion as a combination of the bar-like light source L and the Fresnel lens F involves smaller distance between the bar-like light source L and the Fresnel lens F, for example, angle of incidence Q1 of light shown as L1 in FIG. 12 emitted from a right end portion Lb of the bar-like light source L and incoming to a left end region Fa of the Fresnel lens F is larger than angle of incidence Q2 of light L2 emitted from the right end portion Lb and incoming to the left end region Fa in case the distance D2 between the bar-like light source L and the Fresnel lens F is large and the rainbow-like unevenness is not remarkable as shown with broken lines.

Such a situation also occurs with respect to light emitted from a left end portion La of the bar-like light source L and incoming to a right end region Fb of the Fresnel lens F and light reflected by the reflector K around the left or right end portions La or Lb of the bar-like light source L and incoming to the left or right end regions Fa or Fb of the Fresnel lens F, though not shown in the figure.

In other words, the Fresnel lens F is assumed to influence as a prism more strongly incident light from around the left and right end portions La and Lb of the bar-like light source L having larger angle of incidence. Thus, for example, the light L1 incoming to the Fresnel lens F with the angle of incidence Q1 is assumed to be emitted from the Fresnel lens F as light L3 dispersed with angle of emergence being about 30 degrees to both longitudinal ends of the bar-like light source L after being influenced by refractive action including spectral action by the Fresnel lens F. Similarly, the light reflected by the reflector K around the left or right end portions La or Lb of the bar-like light source L is assumed to be emitted from the Fresnel lens F after being dispersed by the Fresnel lens F.

Therefore, the rainbow-like unevenness appearing on a photograph when the photograph is actually taken is assumed to be generated by dispersed light such as the emitted light L3 as mentioned in the above.

By the way, let us take again the respective prior art mentioned in the above. In the respective prior art, though members to be moved to make the apparatus capable of varying the emission angle differ to some extent, the relative position of the bar-like light source and the Fresnel lens is changed between what is called a state on the wide side corresponding to a wide angle photographing lens and what is called a state on the telescopic side corresponding to a telescopic photographing lens. More specifically, in the state on the wide side, the flash discharge tube 3 as the bar-like light source and the Fresnel lens 4 are close to each other, and thus, each of the respective prior art has a disadvantage that, when the light emitting portion is miniaturized to miniaturize the apparatus, rainbow-like unevenness occurs especially in the state on the wide side.

DISCLOSURE OF THE INVENTION

The present invention is made in view of the above-mentioned disadvantages, and an object of the present invention is to provide a flash apparatus capable of varying the emission angle which can prevent rainbow-like unevenness based on prism action of a Fresnel lens even in a state on the wide side when a light emitting portion is miniaturized.

In order to attain the object, a flash apparatus capable of varying the emission angle described in claim 1 of the present invention is comprised of at least a bar-like light source disposed in a reflector and a light controller disposed in front of the reflector and can vary the light emission angle by changing the relative distance between the reflector provided with the bar-like light source and the light controller or the position of the bar-like light source with respect to the reflector, and is characterized in that the light controller is configured to comprise: a diffusion controlling portion having light diffusive action only with respect to the longitudinal direction of the bar-like light source; and a condensation controlling portion having condensing action to omnidirectionally condense light supplied directly from the bar-like light source or via the reflector.

Further, a flash apparatus capable of varying the emission angle described in Claim 4 of the present invention is comprised of at least a bar-like light source disposed in a reflector and a light controller disposed in front of the reflector, and is characterized in that the light controller of the flash apparatus capable of varying the emission angle which can vary the light emission angle by changing the relative distance between the reflector provided with the bar-like light source and the light controller or the position of the bar-like light source with respect to the reflector is configured to comprise: a first light controlling member and a second light controlling member which are provided in front of the reflector in this order from the side of the bar-like light source; the first light controlling member being composed of a first concave cylindrical lens formed on an opposing face to the bar-like light source in the longitudinal direction of the bar-like light source and having light diffusive action with respect to a direction perpendicular to the longitudinal direction of the bar-like light source, and a Fresnel lens provided with a ring-zonal lens formed on the other face, having at least one vertex and having condensing action to omnidirectionally condense light supplied directly from the bar-like light source or via the reflector, said ring-zonal lens being formed by dividing a curved face of a lens into a plurality of concentric curved face portions and by connecting the divided curved face portions together to each other at respective sections; and the second light controlling member being composed of a plate-like optical member provided with a second concave cylindrical lens formed on an opposing face to the ring-zonal lens in a direction perpendicular to the first concave cylindrical lens.

Still further, a flash apparatus capable of varying the emission angle described in Claim 5 of the present invention is comprised of at least a bar-like light source disposed in a reflector and a light controller disposed in front of the reflector. The flash apparatus capable of varying the emission angle can vary the light emission angle by changing the relative distance between the reflector provided with the bar-like light source and the light controller or the position of the bar-like light source with respect to the reflector and, at the same time, by changing the size of an aperture of the reflector in the longitudinal direction of the bar-like light source to be narrower when the bar-like light source and the light controller approach to each other. The apparatus is characterized in that the light controller is configured to comprise: a concave cylindrical lens formed on an opposing face to the bar-like light source in a direction perpendicular to the longitudinal direction of the bar-like light source and having light diffusive action only with respect to the longitudinal direction of the bar-like light source; and a Fresnel lens provided with a ring-zonal lens formed on the other face, having at least one vertex and having condensing action to omnidirectionally condense light supplied directly from the bar-like light source or via the reflector, said ring-zonal lens being formed by dividing a curved face of a lens into a plurality of concentric curved face portions and by connecting the divided curved face portions together to each other at respective sections, and a condensing lens formed in such a manner as not to cover the narrowed aperture of the reflector and having condensing action with respect to the longitudinal direction of the bar-like light source.

A flash apparatus capable of varying the emission angle described in Claim 6 of the present invention is similar to the one described in Claim 5, comprising at least a bar-like light source disposed in a reflector and a light controller disposed in front of the reflector, and can vary the light emission angle by changing the relative distance between the reflector provided with the bar-like light source and the light controller or the position of the bar-like light source with respect to the reflector and, at the same time, by changing the size of the aperture of the reflector in the longitudinal direction of the bar-like light source to be narrower when the bar-like light source and a Fresnel lens approach to each other. However, the light controller of this flash apparatus comprises: a first light controlling member and a second light controlling member which are provided in front of the reflector in this order from the side of the bar-like light source; the first light controlling member being composed of a first concave cylindrical lens formed on an opposing face to the bar-like light source in the longitudinal direction of the bar-like light source and having light diffusive action with respect to the longitudinal direction of the bar-like light source, and a Fresnel lens provided with a ring-zonal lens formed on the other face, having at least one vertex and having condensing action to omnidirectionally condense light supplied directly from the bar-like light source or via the reflector, said ring-zonal lens being formed by dividing a curved face of a lens into a plurality of concentric curved face portions and connecting the divided other at re portions together to each other at respective sections; the second light controlling member being provided with a second concave cylindrical lens formed on an opposing face to the ring-zonal lens in a direction perpendicular to the first concave cylindrical lens, and a condensing lens formed on the other face in such a manner as not to cover the narrowed aperture of the reflector and having condensing action with respect to the longitudinal direction of the bar-like light source.

BRIEF DESCRIPTION OF THE DRAWINGS

FIG. 8 is a partial schematic exploded perspective view of a fourth embodiment of a flash apparatus capable of varying the emission angle according to the present invention;

FIG. 10 is a partial schematic view of a conventionally well-known flash apparatus capable of varying the emission angle;

FIG. 11A is a partial schematic view of an apparatus disclosed in Japanese Patent Publication No. 62-51453 illustrating a state on the wide side;

FIG. 11B is a partial schematic view of the apparatus disclosed in Japanese Patent Publication No. 62-51453 illustrating a state on the telescopic side; and FIG. 12 is a view illustrating a state of light incoming from a bar-like light source to a Fresnel lens and passing through the Fresnel lens and the like.

DESCRIPTION OF THE EMBODIMENTS

Several embodiments of the present invention are now described with reference to FIGS. 1 to 9.

FIGS. 1, 2A, 2B, and 2C are schematic views illustrating a partial configuration of a first embodiment of a flash apparatus capable of varying the emission angle according to the present invention.

Figure 1:
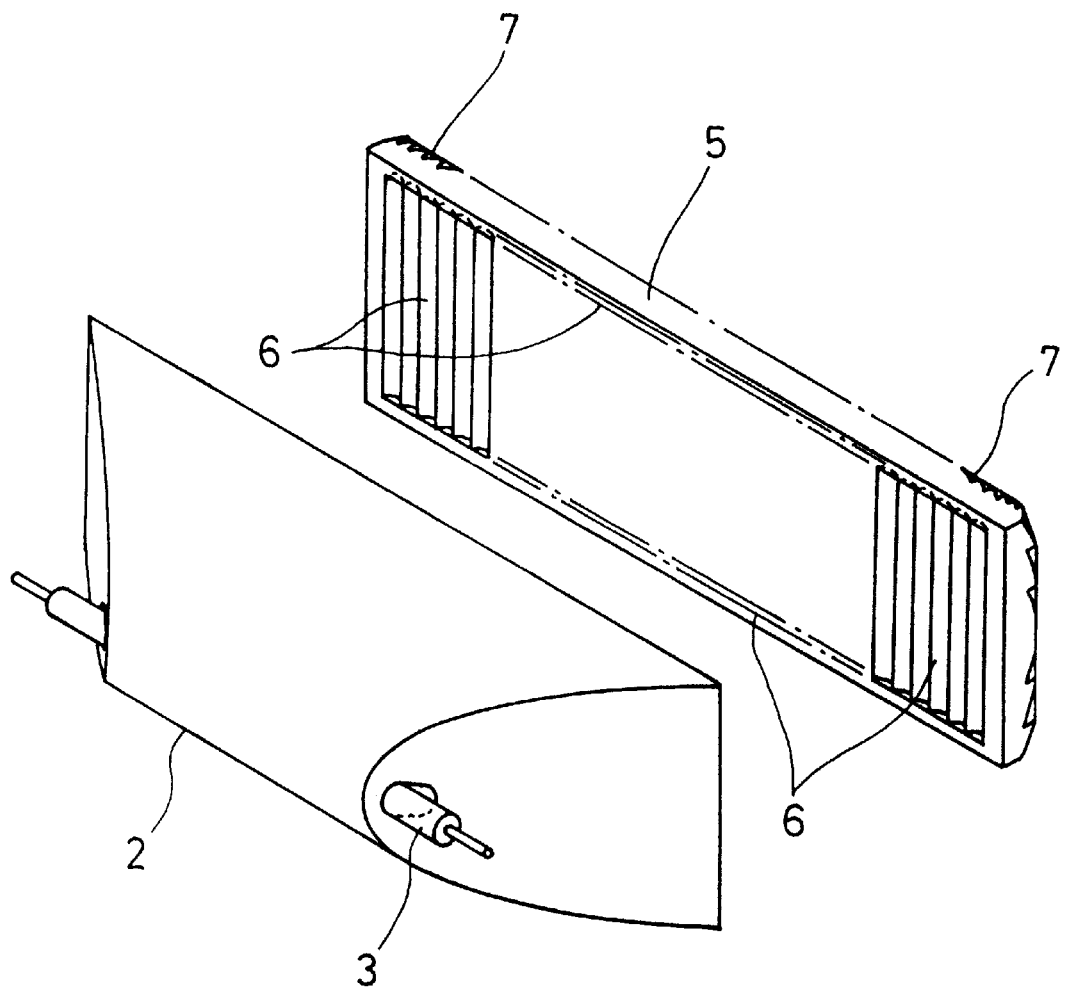
FIG. 1 is a partial schematic exploded perspective view of a first embodiment of a flash apparatus capable of varying the emission angle according to the present invention.
Figure 2A:
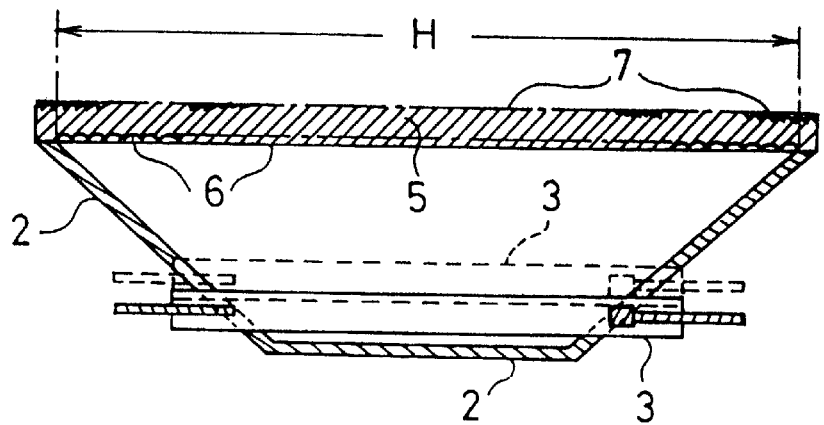
FIG. 2A is a schematic transverse sectional view of the first embodiment shown in FIG. 1 in an assembled state.
Figure 2B:
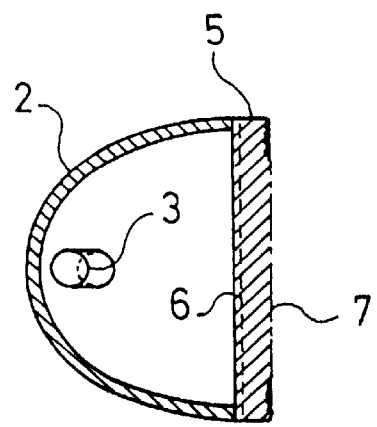
FIG. 2B is a schematic vertical sectional view of the first embodiment shown in FIG. 1 in the assembled state.
Figure 2C:
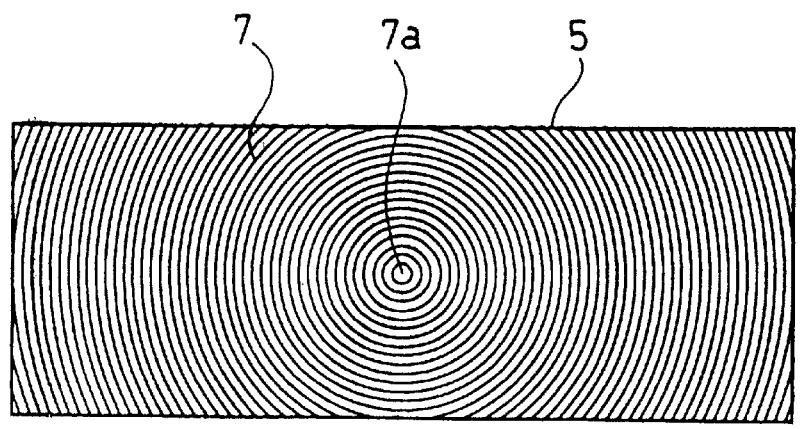
FIG. 2C is a schematic front elevational view of a light controller denoted by a reference character 5 in FIG. 1.

FIG. 1 is a partial schematic exploded perspective view of the first embodiment. FIG. 2A is a schematic transverse sectional view of the first embodiment shown in FIG. 1 in an assembled state. FIG. 2B is a schematic vertical sectional view of the first embodiment shown in FIG. 1 in the assembled state. FIG. 2C is a schematic front elevational view of a light controller denoted by a reference character 5 in FIG. 1. Throughout the figures, like reference characters as in FIG. 10 and the like designate like functional components.

The first embodiment is a flash apparatus capable of varying the emission angle which can vary the light emission angle by changing the position of the flash discharge tube 3 as a bar-like light source with respect to the reflector 2. The apparatus is provided in front of the reflector 2 with a light controller 5 for controlling diffusion and condensation of supplied light.

The light controller 5 of the first embodiment is disposed in front of the reflector 2 so as to comprise a diffusion controlling portion 6 having light diffusive action only with respect to the longitudinal direction of the flash discharge tube 3 and a condensation controlling portion 7 for omnidirectionally condensing light supplied directly from the flash discharge tube 3 or via the reflector 2.

More specifically, the light controller 5 is configured to comprise a concave cylindrical lens as the diffusion controlling portion 6 which is formed on an opposing face to the flash discharge tube 3 in the direction perpendicular to the longitudinal direction of the flash discharge tube 3, and a Fresnel lens formed on the other face as the condensation controlling portion 7 which is provided with a ring-zonal lens having one vertex 7a and formed by dividing a curved face of a lens into a plurality of concentric curved face portions and by connecting the divided curved face portions together to each other at respective sections.

It is to be noted that, in FIG. 2, the flash discharge tube 3 shown with solid lines is in what is called a state on the telescopic side corresponding to a telescopic lens where the discharge tube 3 and the light controller 5 are away from each other, and the flash discharge tube 3 shown with broken lines is in what is called a state on the wide side corresponding to a wide angle lens where the discharge tube 3 and the light controller 5 are close to each other.

Therefore, light supplied directly from the flash discharge tube 3 or via the reflector 2 to the Fresnel lens as the light controller 5 is diffused with respect to the longitudinal direction of the flash discharge tube 3 by the concave cylindrical lens as the diffusion controlling portion 6, omnidirectionally condensed by the ring-zonal lens as the condensation controlling portion 7, and then emitted to the outside.

Figure 12:
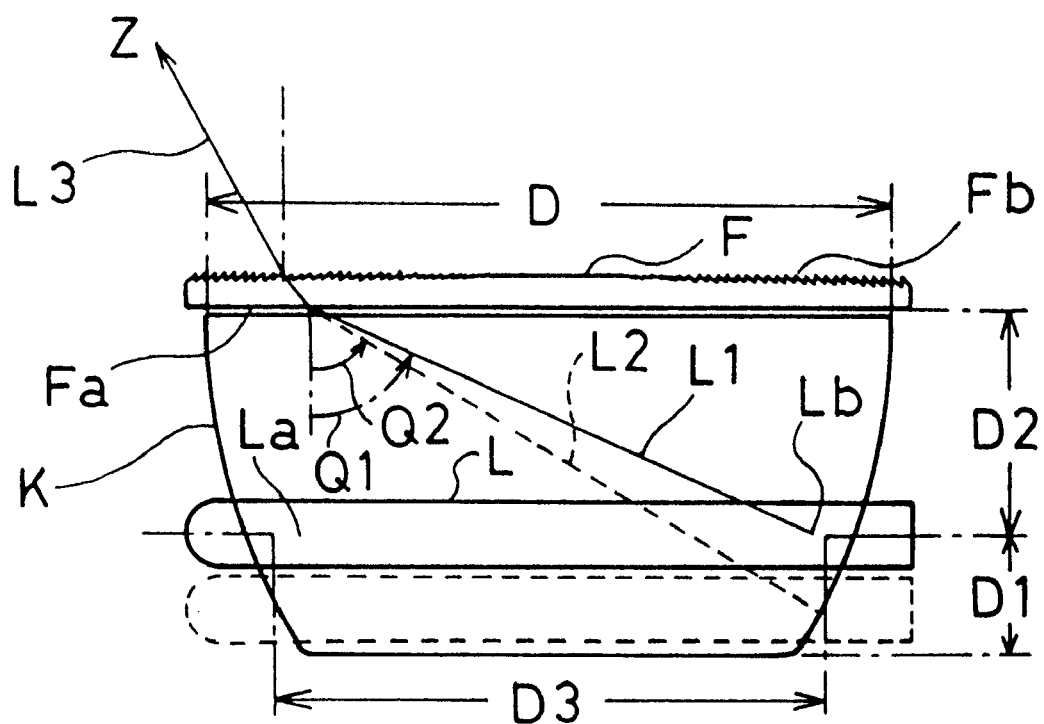

More specifically, in the first embodiment, light from the flash discharge tube 3 or the like is incoming to the concave face of the concave cylindrical lens as the diffusion controlling portion 6. This greatly reduces the ratio of light having larger angle of incidence described with Q2 and the like with reference to FIG. 12 to light incoming to the concave face. Consequently, occurrence of the prism action described at the beginning can be greatly restricted.

In other words, action to diffuse light incoming from the flash discharge tube 3 and the like in the longitudinal direction of the flash discharge tube 3 at the diffusion controlling portion 6 in the first embodiment controls the prism action greatly to an actually negligible extent compared with the case where light from the flash discharge tube 3 and the like are incoming to a Fresnel lens via a flat portion.

Therefore, light incoming to the Fresnel lens as the light controller 5 reaches the condensation controlling portion 7 without being influenced by the prism action, and is emitted to the outside of the light controller 5 by the condensing action of said condensation controlling portion 7. In other words, the light is emitted to the outside of the light controller 5 without being dispersed. As a result, rainbow-like unevenness is prevented from appearing on a photograph when the photograph is actually taken.

As described in the above, a flash apparatus capable of varying the emission angle according to claim 1 of the present invention is configured such that the light controller 5 is disposed in front of the reflector 2, the light controller 5 comprising the diffusion controlling portion 6 having light diffusive action only with respect to the longitudinal direction of the flash discharge tube 3 as the bar-like light source and the condensation controlling portion 7 having condensing action to omnidirectionally condense light supplied directly from the flash discharge tube 3 or via the reflector 2.

Therefore, prism action can be restricted by controlling the angle of incidence of light incoming from the flash discharge tube 3 to the light controller 5 by the action of the diffusion controlling portion 6. By this, a flash apparatus capable of varying the emission angle can be obtained with which rainbow-like unevenness is prevented from occurring even in a state on the wide side when the light emitting portion is miniaturized.

Figure 3A:
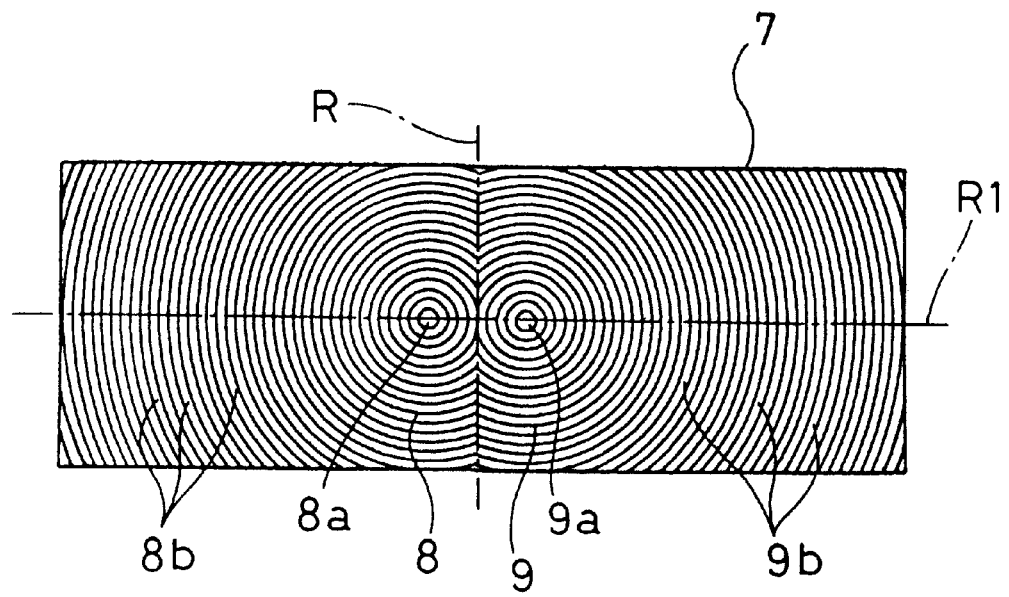
FIG. 3A is a schematic front elevational view of another example of a condensation controlling portion denoted by a reference character 7 in FIG. 1.
Figure 3B:
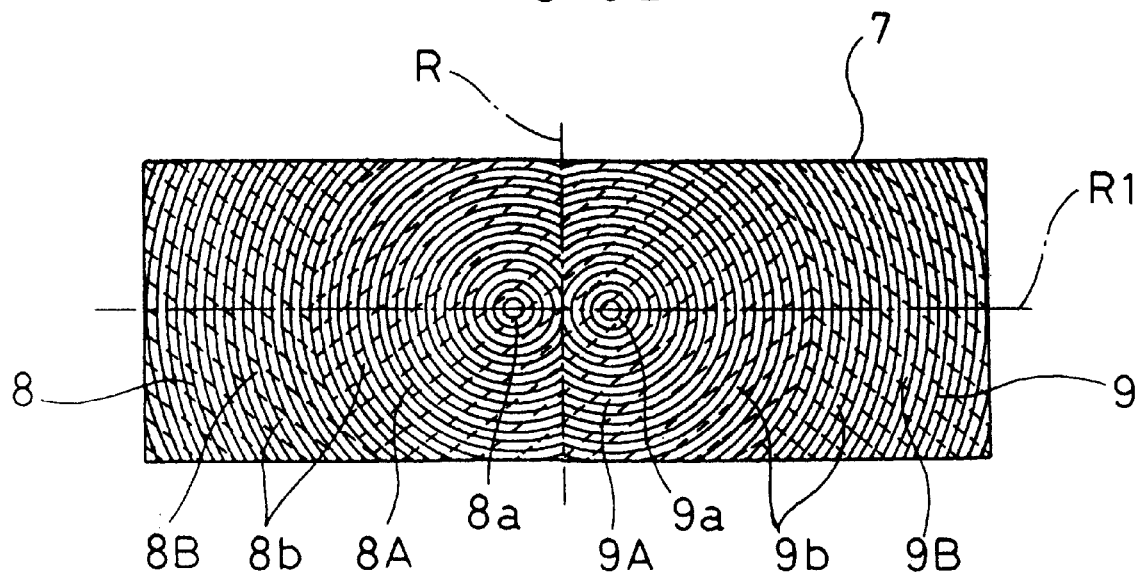
FIG. 3B is a schematic front elevational view of still another example of the condensation controlling portion denoted by the reference character 7 in FIG. 1.

It is to be noted that, though the ring-zonal lens having the one vertex 7a and formed by dividing a curved face of a lens into a plurality of concentric curved face portions and by connecting the divided curved face portions together at respective sections is adopted as the condensation controlling portion 7 in the first embodiment, a ring-zonal lens formed by a first condensation controlling portion 8 and a second condensation controlling portion 9 having vertexes 8a and 9a and ring-zonal lens curved faces 8b and 9b connected thereto, respectively, may be adopted as shown in FIGS. 3A and 3B.

It is to be noted that the first condensation controlling portion 8 and the second condensation controlling portion 9 are symmetrical with respect to a fiducial line R which is across the center of the longitudinal length of the flash discharge tube 3 as the bar-like light source so as to be perpendicular to the longitudinal direction, said fiducial line R being the center line of the longitudinal length of the aperture of the reflector 2.

The vertexes 8a and 9a are disposed on a fiducial line R1 which is the center line of the aperture of the reflector 2 in the direction perpendicular to the longitudinal direction, and are disposed so as to have a distance therebetween of ½ or less of the size of the aperture in the longitudinal direction of the reflector 2 in a state on the wide side, preferably in a range of 0.2–0.4 where the size of the aperture H equals 1. It is to be noted that the size of the aperture in the longitudinal direction of the reflector 2 in a state on the wide side of the first embodiment is the size of the aperture in the longitudinal direction of the reflector 2 as denoted by a character H in FIG. 2A, since the first embodiment varies the light emission angle by changing the position of the flash discharge tube 3 as the bar-like light source with respect to the reflector 2.

Further, the ring-zonal lens curved faces 8b and 9b may be formed by an aspherical lens curved faces of angles having the same condensation characteristics as shown in FIG. 3A, or, as shown by broken lines having different angles in FIG. 3B, the first optical portions 8A and 9A having first condensation characteristics and including the vertexes 8a and 9a and the second optical portions 8B and 9B provided so as to be connected with the first optical portions 8A and 9A and having second condensation characteristics different from the first condensation characteristics may be formed by, for example, an aspherical lens curved faces.

In this case, similarly to the case as mentioned in the above, it has been observed not only that occurrence of the prism action can be controlled, and therefore, action and effect to prevent rainbow-like unevenness from occurring can be expected, but also action capable of setting wider light emission angle can be expected when a wide-angle photograph is taken with the apparatus.

Figure 4:
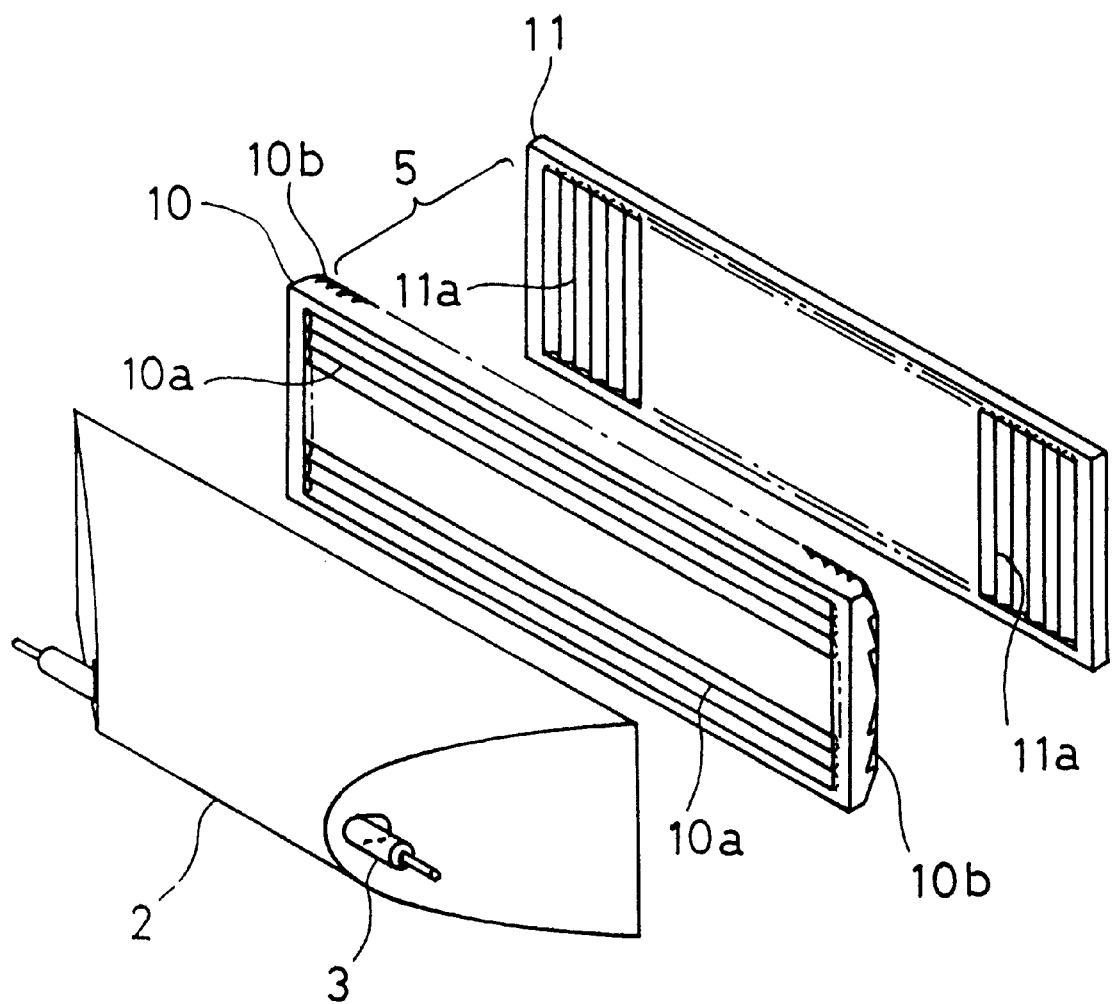
FIG. 4 is a partial schematic exploded perspective view of a second embodiment of a flash apparatus capable of varying the emission angle according to the present invention.
Figure 5A:
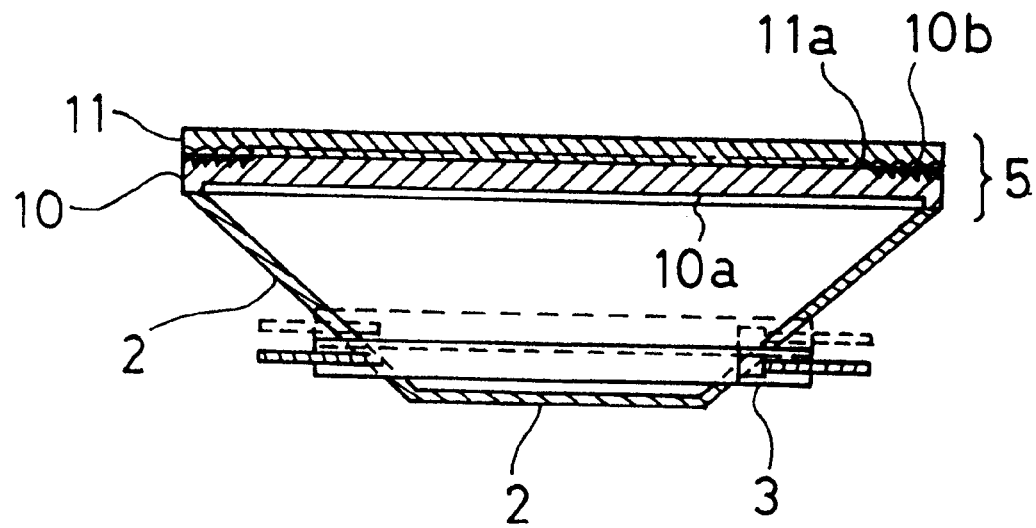
FIG. 5A is a schematic transverse sectional view of the second embodiment shown in FIG. 4 in an assembled state.
Figure 5B:
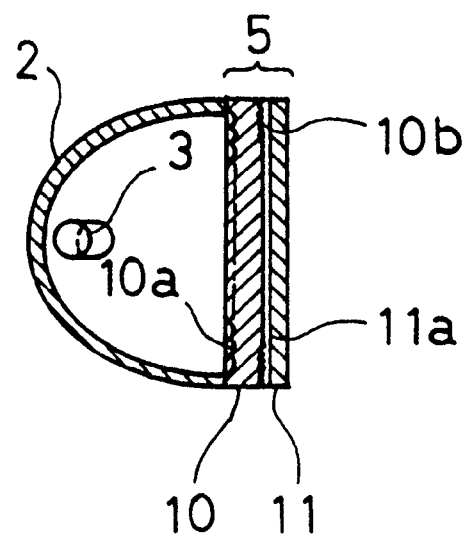
FIG. 5B is a schematic vertical sectional view of the second embodiment shown in FIG. 4 in the assembled state.

FIGS. 4, 5A, and 5B are schematic views illustrating a partial configuration of a second embodiment of a flash apparatus capable of varying the emission angle according to the present invention.

FIG. 4 is a partial schematic exploded perspective view of the second embodiment. FIG. 5A is a schematic transverse sectional view of the second embodiment shown in FIG. 4 in an assembled state. FIG. 5B is a schematic vertical sectional view of the second embodiment shown in FIG. 4 in the assembled state. Throughout the figures, like reference characters as in FIG. 1 designate like functional components.

Similarly to the first embodiment, the second embodiment is made of a flash apparatus capable of varying the emission angle which can vary the light emission angle by changing the position of the flash discharge tube 3 as a bar-like light source with respect to the reflector 2. The apparatus is provided in front of the reflector 2 with the light controller 5 for controlling diffusion and condensation of supplied light.

The light controller 5 of the second embodiment is configured by a first light controlling member 10 and a second light controlling member 11 which are plate-shaped and provided in front of the reflector 2 in this order from the side of the flash discharge tube 3.

The first light controlling member 10 is composed of a first concave cylindrical lens 10a formed on an opposing face to the flash discharge tube 3 in the longitudinal direction of the flash discharge tube 3 and having light diffusive action with respect to the direction perpendicular to the longitudinal direction of the flash discharge tube 3 and a Fresnel lens provided with a ring-zonal lens 10b formed on the other face having at least one vertex, having condensing action to omnidirectionally condense light supplied directly from the flash discharge tube 3 or via the reflector 2, and formed by dividing a curved face of a lens into a plurality of concentric curved face portions and by connecting the divided curved face portions together at respective sections.

The second light controlling member 11 is composed of a plate-like member provided with a second concave cylindrical lens 11a formed on an opposing face to the ring-zonal lens 10b in the direction perpendicular to the first concave cylindrical lens 10a.

Therefore, light supplied directly from the flash discharge tube 3 or via the reflector 2 to the first and second light controlling members 10 and 11 forming the light controller 5 is diffused with respect to the direction perpendicular to the longitudinal direction of the flash discharge tube 3 by the first concave cylindrical lens 10a, omnidirectionally condensed by the ring-zonal lens 10b, diffused with respect to the longitudinal direction of the flash discharge tube 3 by the second concave cylindrical lens 11a, and then emitted to the outside.

That is to say, in the second embodiment, similarly to the first embodiment, light from the flash discharge tube 3 or the like is incoming to the concave face of the second concave cylindrical lens 11a having diffusive action with respect to the longitudinal direction of the flash discharge tube 3, and consequently, occurrence of the prism action described at the beginning can be restricted to an actually negligible extent.

In other words, similar to the first embodiment, light incoming to the first and the second light controlling members 10 and 11 is emitted to the outside of the light controller 5 without being greatly influenced by the prism action.

That is, the light is emitted to the outside of the light controller 5 without being dispersed. As a result, similarly to the first embodiment, rainbow-like unevenness is prevented from appearing on a wide-angle photograph actually taken even when the light emitting portion is miniaturized.

Further, different from the first embodiment, in the second embodiment, the light controller 5 is separated into the first and the second light controlling members 10 and 11 formed by a Fresnel lens and a plate-like member to form three kinds of light controlling acting portions. Thus, in addition to the controlling of the prism action, it has been observed by the applicants of the present application that, out of light distribution characteristics of light emitted to the outside via the light controller 5 formed by the first and the second light controlling members 10 and 11, such characteristics as in the direction perpendicular to the longitudinal direction of the flash discharge tube 3, in particular, can be smoothly controlled, and that it is possible to reduce the occurrence of unevenness of luminance in the same direction when a photograph is actually taken.

It is to be noted that, as the ring-zonal lens 10b of the Fresnel lens forming the first light controlling member 10 in the second embodiment, the ring-zonal lens shown in FIG. 2C referred to in the description of the first embodiment, or, the ring-zonal lens shown in FIG. 3A or 3B may be adopted. Particularly, in case the ring-zonal lens shown in FIG. 3A or 3B is adopted, as described above, not only occurrence of the prism action can be controlled to prevent rainbow-like unevenness from occurring, but also wider light emission angle can be set when a wide-angle photograph is taken with the apparatus.

Figure 6:
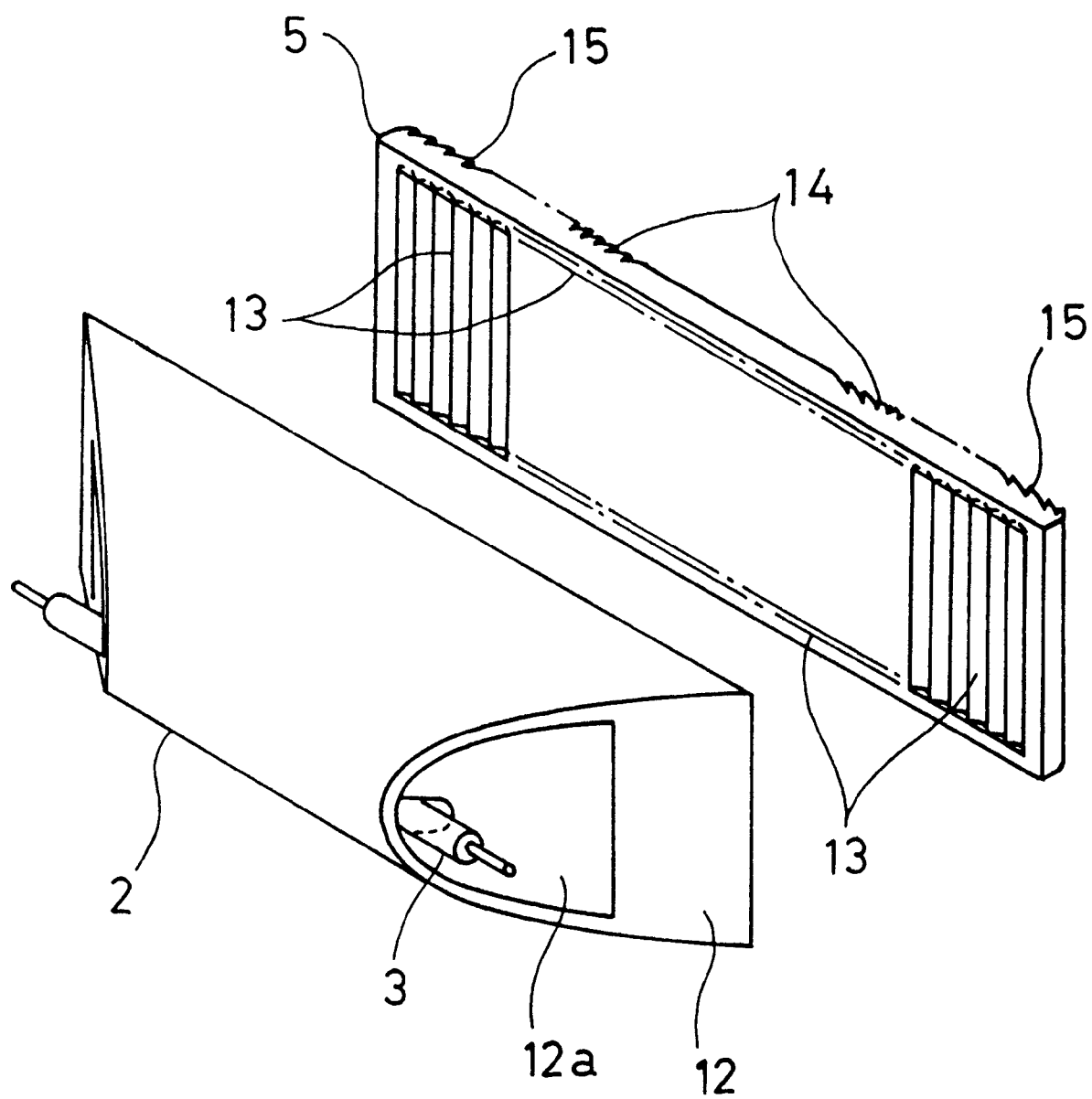
FIG. 6 is a partial schematic exploded perspective view of a third embodiment of a flash apparatus capable of varying the emission angle according to the present invention.
Figure 7A:
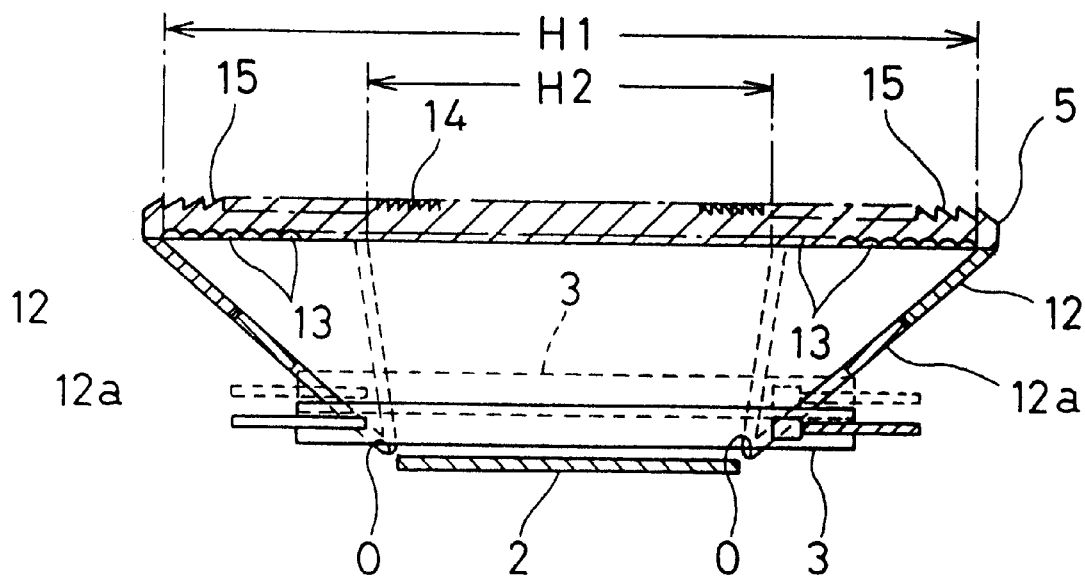
FIG. 7A is a schematic transverse sectional view of the third embodiment shown in FIG. 6 in an assembled state.
Figure 7B:
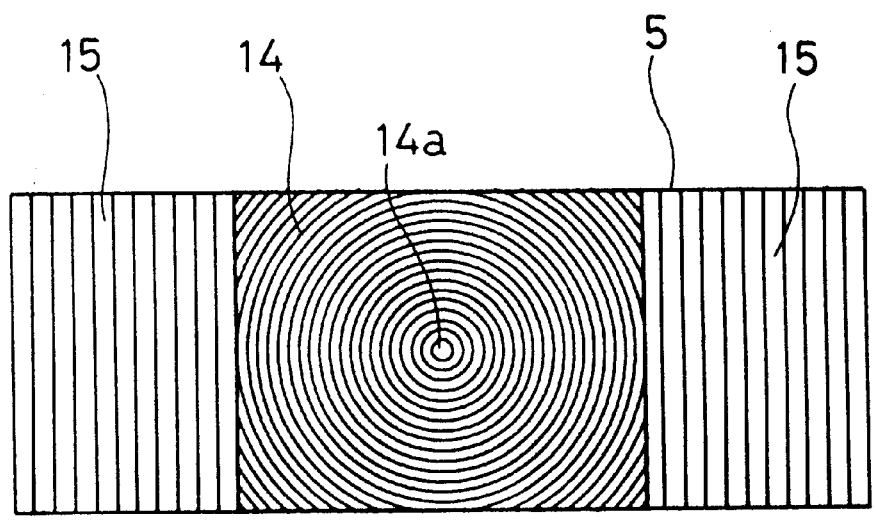
FIG. 7B is a schematic front elevational view of a light controller denoted by the reference character 5 in FIG. 6.

FIGS. 6, 7A, and 7B are schematic views illustrating a partial configuration of a third embodiment of a flash apparatus capable of varying the emission angle according to the present invention. FIG. 6 is a partial schematic exploded perspective view of the third embodiment. FIG. 7A is a schematic transverse sectional view of the third embodiment shown in FIG. 6 in an assembled state. FIG. 7B is a schematic front elevational view of a light controller denoted by the reference character 5 in FIG. 7A. Throughout the figures, like reference characters, as used in FIG. 1 and the like, designate the components having like functions.

The third embodiment is, as is clear particularly from FIG. 7A, a flash apparatus capable of varying the emission angle provided with the light controller 5 in front of the reflector 2 for controlling diffusion and condensation of supplied light and capable of varying the light emission angle by changing the position of the flash discharge tube 3 as the bar-like light source with respect to the reflector 2 and by changing the size of the aperture of the reflector 2 in the longitudinal direction of the flash discharge tube 3 so as to be narrower when the flash discharge tube 3 and the light controller 5 are closer to each other.

In other words, the third embodiment is an embodiment which is configured such that part portion 12a of a pair of side reflecting portions denoted by a reference character 12 in FIG. 7A located at both ends of the reflector 2 in the longitudinal direction of the flash discharge tube 3 are rotatable in response to movement of the flash discharge tube 3 about, for example, pivot axes 0 at appropriate places at the bottom of the reflector 2.

More specifically, the embodiment is configured such that the size of the aperture of the reflector 2 in the longitudinal direction of the flash discharge tube 3 is capable of varying between a state where the widest size H1 of the aperture is set corresponding to a state on the telescopic side where the flash discharge tube 3 and the light controller 5 are away from each other as shown by solid lines in FIG. 7A and a state where the narrowest size H2 of the aperture is set corresponding to a state on the wide side where the flash discharge tube 3 and the light controller 5 are close to each other as shown by broken lines in FIG. 7A.

The light controller 5 of the third embodiment is composed of: a concave cylindrical lens 13 formed on an opposing face to the flash discharge tube 3 and having light diffusive action only with respect to the longitudinal direction of the flash discharge tube 3; and a Fresnel lens provided with a ring-zonal lens 14 formed on the other face in a center region covering the narrow size H2 of the aperture of the reflector 2, having one vertex 14a and having condensing action to omnidirectionally condense supplied light, and provided with a condensing lens 15 also formed on the other face but in distal regions other than the above-mentioned center region and having condensation characteristics different from those of the ring-zonal lens 14; said light controller 5 being disposed in front of the reflector 2.

In addition, in the third embodiment, the condensing lens 15 is configured by a strip-like lens formed by, for example, dividing a curved face of a lens having intenser condensation characteristics than those of the ring-zonal lens 14 and having condensing action only with respect to the longitudinal direction of the flash discharge tube 3 into a plurality of curved face portions in the direction perpendicular to the longitudinal direction of the flash discharge tube 3 and by connecting the divided curved face portions together at respective sections.

Since the third embodiment is configured as in the above, in a state on the wide side where the flash discharge tube 3 and the light controller 5 are close to each other and the size of the aperture of the reflector 2 is set to be the narrow size H2, light supplied to the Fresnel lens as the light controller 5 directly from the flash discharge tube 3 or via the reflector 2 is diffused by the concave cylindrical lens 13 in the longitudinal direction of the flash discharge tube 3, omnidirectionally condensed by the ring-zonal lens 14 without being influenced by the condensing lens 15, and then emitted to the outside.

On the other hand, in a state on the telescopic side where the flash discharge tube 3 and the light controller 5 are away from each other and the size of the aperture of the reflector 2 is set to be the wide size H1, light supplied to the Fresnel lens as the light controller 5 directly from the flash discharge tube 3 or via the reflector 2 is diffused by the concave cylindrical lens 13 in the longitudinal direction of the flash discharge tube 3, condensed by the ring-zonal lens 14 and by the condensing lens 15 omnidirectionally and in the longitudinal direction of the flash discharge tube 3, and then emitted to the outside.

Therefore, in the third embodiment of the present invention, similarly to the first embodiment, in a state on the wide side, light incoming to the light controller 5 from the flash discharge tube 3 and the like is incoming to the concave face of the concave cylindrical lens 13. Thus, the light is emitted to the outside of the light controller 5 without being greatly influenced by the prism action. In other words, the light is emitted to the outside of the light controller 5 without being dispersed. As a result, rainbow-like unevenness is prevented from appearing on a wide-angle photograph actually taken even when the light emitting portion is miniaturized.

In a state on the telescopic side, light supplied by the condensing lens 15 directly from the flash discharge tube 3 or via the reflector 2 to the distal regions of the concave cylindrical lens 13 to be diffused is condensed particularly with respect to the longitudinal direction of the flash discharge tube 3. As a result, compared to the apparatus of the first embodiment where only an ordinary ring-zonal lens is formed, light supplied to the distal regions of the concave cylindrical lens 13 can be emitted to the outside with better condensation characteristics without causing insufficient condensing.

It is to be noted that, as the ring-zonal lens 14 in the third embodiment, the ring-zonal lens shown in FIG. 3A or 3B may be adopted. In other words, a ring-zonal lens having two vertexes disposed so as to have therebetween a distance of ½ or less of the narrow size H2 of the aperture of the reflector 2 in the longitudinal direction in a state on the wide side, preferably in a range of 0.2–0.4 where the size of the aperture H2 equals 1 and having ring-zonal lens curved faces connected therewith. In that case, similarly to the case of the first embodiment, not only occurrence of the prism action can be controlled to prevent rainbow-like unevenness from occurring, but also wider light emission angle can be set when a photograph is taken with the apparatus being in a state on the wide side.

Further, with respect to the condensing lens 15, though a strip-like lens is adopted in the third embodiment, it is not restricted to such a strip-like lens. For example, the condensing lens 15 may be configured by forming, in distal regions other than the center region, a ring-zonal lens having intenser condensation characteristics than those of the ring-zonal lens 14 formed in the center region covering the narrow size H2 of the aperture of the reflector 2.

Figure 9A:
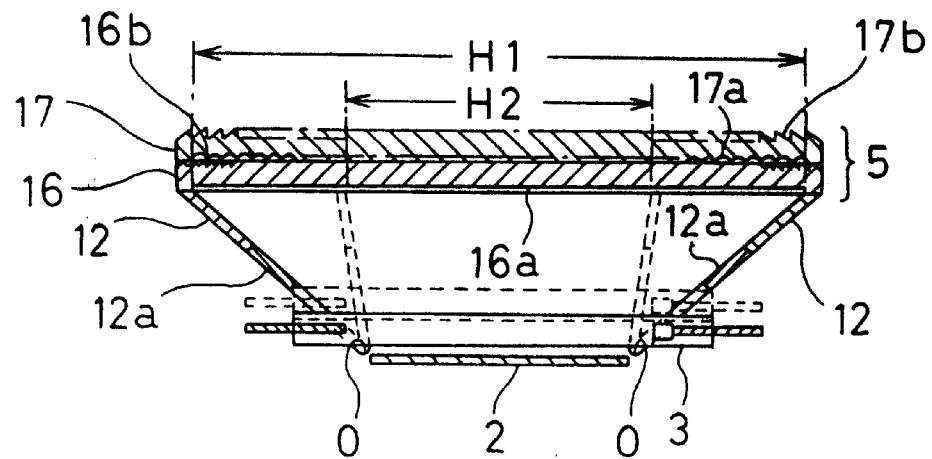
FIG. 9A is a schematic transverse sectional view of the fourth embodiment shown in FIG. 8 in an assembled state.
Figure 9B:
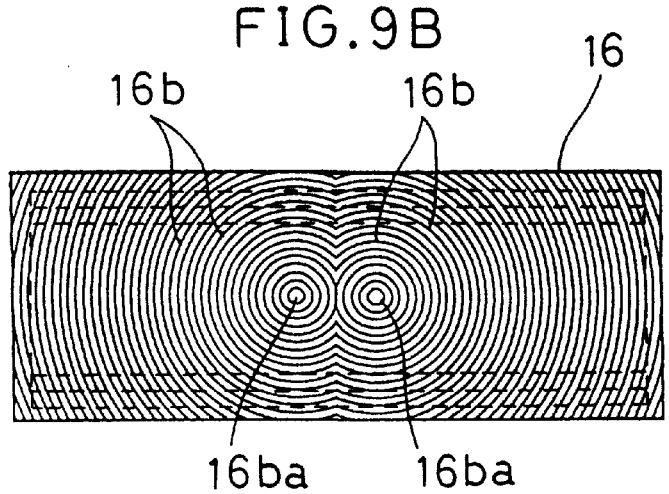
FIG. 9B is a schematic front elevational view of a first light controlling member denoted by a reference character 16 in FIG. 8.
Figure 9C:
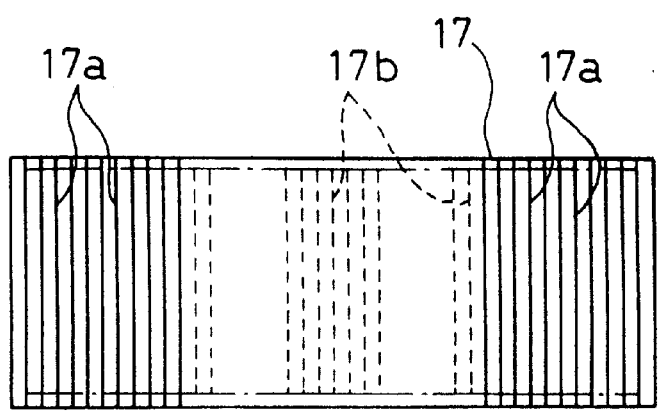
FIG. 9C is a schematic front elevational view of a second light controlling member denoted by a reference character 17 in FIG. 8.

FIGS. 8, 9A, 9B, and 9C are schematic views illustrating a partial configuration of a fourth embodiment of a flash apparatus capable of varying the emission angle according to the present invention. FIG. 8 is a partial schematic exploded perspective view of the fourth embodiment. FIG. 9A is a schematic transverse sectional view of the fourth embodiment shown in FIG. 8 in an assembled state. FIG. 9B is a schematic front elevational view of a first light controlling member denoted by the reference character 16 in FIG. 8. FIG. 9C is a schematic front elevational view of a second light controlling member denoted by the reference character 17 in FIG. 8. Throughout the figures, like reference characters, as used in FIG. 4 and the like, designate like functional components.

The fourth embodiment is, as is clear particularly from FIG. 9A, similarly to the third embodiment, a flash apparatus capable of varying the emission angle provided with the light controller 5 in front of the reflector 2 for controlling diffusion and condensation of supplied light and capable of varying the light emission angle by changing the position of the flash discharge tube 3 as the bar-like light source with respect to the reflector 2 and by changing the size of the aperture of the reflector 2 in the longitudinal direction of the flash discharge tube 3 so as to be narrower as the flash discharge tube 3 and the light controller 5 are closer to each other.

The light controller 5 of the fourth embodiment is, as shown in FIG. 8 and the like, formed by a first light controlling member 16 and a second light controlling member 17 which are provided in front of the reflector 2 in this order from the side of the flash discharge tube 3.

The first light controlling member 16 is composed of: a first concave cylindrical lens 16a formed on an opposing face to the flash discharge tube 3 in the longitudinal direction of the flash discharge tube 3 and having light diffusive action with respect to the direction perpendicular to the longitudinal direction of the flash discharge tube 3; and a Fresnel lens provided with a ring-zonal lens 16b formed on the other face having two vertexes 16ba and 16ba as shown in FIG. 3A, having condensing action to omnidirectionally condense light supplied directly from the flash discharge tube 3 or via the reflector 2, and formed by dividing a curved face of a lens into a plurality of concentric curved face portions and connecting the divided curved face portions together at respective sections.

The second light controlling member 17 is formed by a plate-like optical member provided with a second concave cylindrical lens 17a formed on an opposing face to the ring-zonal lens 16b in a direction perpendicular to the first concave cylindrical lens 16a and provided with a condensing lens 17b on the other face formed so as not to cover the narrow size H2 of the aperture of the reflector 2 and having condensing action different from that of the ring-zonal lens 16b.

In the fourth embodiment, similarly to the third embodiment, the condensing lens 17b is configured by a strip-like lens formed, for example, by dividing a curved face of a lens having intenser condensation characteristics than those of the ring-zonal lens 16b and having condensing action only with respect to the longitudinal direction of the flash discharge tube 3 into a plurality of curved face portions in the direction perpendicular to the longitudinal direction of the flash discharge tube 3 and by connecting the divided curved face portions together t o each other at respective sections.

In the fourth embodiment configured as in the above, in a state on the wide side where the flash discharge tube 3 and the light controller 5 are close to each other and the size of the aperture of the reflector 2 is set to be the narrow size H2, light supplied to the light controller 5 directly from the flash discharge tube 3 or via the reflector 2 is diffused by the first concave cylindrical lens 16a in the direction perpendicular to the longitudinal direction of the flash discharge tube 3, omnidirectionally condensed by the ring-zonal lens 16b, diffused by the second concave cylindrical lens 17a in the longitudinal direction of the flash discharge tube 3 without being influenced by the condensing lens 17b, and then emitted to the outside.

On the other hand, in a state on the telescopic side where the flash discharge tube 3 and the light controller 5 are away from each other and the size of the aperture of the reflector 2 is set to be the wide size H1, light supplied to the light controller 5 directly from the flash discharge tube 3 or via the reflector 2 is diffused by the first concave cylindrical lens 16a in the direction perpendicular to the longitudinal direction of the flash discharge tube 3, omnidirectionally condensed by the ring-zonal lens 16b, and then diffused by the second concave cylindrical lens 17a with respect to the longitudinal direction of the flash discharge tube 3 to be emitted to the outside, or, with respect to light in regions not covering the narrow size H2 of the aperture of the reflector 2 among diffused light, then condensed by the condensing lens 17b with respect to the longitudinal direction of the flash discharge tube 3 to be emitted to the outside.

Therefore, in the fourth embodiment of the present invention, similarly to the second embodiment, light incoming from the flash discharge tube 3 and the like is incoming to the concave face of the second concave cylindrical lens 17a of the plate-like optical member as the second light controlling member 17 via the first concave cylindrical lens 16a and the ring-zonal lens 16b of the Fresnel lens as the first light controlling member 16. Thus, the light is emitted to the outside without being greatly influenced by the prism action, that is, without being dispersed. As a result, rainbow-like unevenness is prevented from appearing on a wide-angle photograph actually taken even when the light emitting portion is miniaturized.

In a state on the telescopic side, light supplied directly from the flash discharge tube 3 or via the reflector 2 to the regions not covering the narrow size H2 of the aperture of the reflector 2 is condensed particularly with respect to the longitudinal direction of the flash discharge tube 3. As a result, compared to the apparatus of the second embodiment where only an ordinary ring-zonal lens is formed, the light can be emitted to the outside with better condensation characteristics without causing insufficient condensing.

Further, the light controller 5 is, different from the third embodiment, separated into the first and the second light controlling members 16 and 17 formed by a Fresnel lens and a plate-like member to form plural kinds of light controlling acting portions. Thus, it has been observed by the applicant (s) of the present application that, in addition to the controlling of the prism action and the like, according to the fourth embodiment, characteristics in the direction perpendicular to the longitudinal direction of the flash discharge tube 3 can be smoothly controlled among light distribution characteristics of light emitted to the outside via the light controller 5 formed by the first and the second light controlling members 16 and 17, and therefore it is possible to reduce the occurrence of unevenness of luminance in the same direction when a photograph is actually taken.

It is to be noted that, though the ring-zonal lens having the two vertexes 16ba and 16ba and having the ring-zonal lens curved faces connected thereto is adopted as the ring-zonal lens 16b of the Fresnel lens forming the first light controlling member 16, the ring-zonal lens, for example, as shown in FIG. 2C or 3B may alternatively be adopted.

What is claimed is:

1. A flash apparatus capable of varying the emission angle, comprising at least a bar-like light source disposed in a reflector and a light controller disposed in front of said reflector, and being capable of varying the light emission angle by changing the relative distance between said reflector provided with said bar-like light source and said light controller or the position of said bar-like light source with respect to said reflector, said apparatus being characterized in that said light controller comprises:
a diffusion controlling portion having light diffusive action only with respect to the longitudinal direction of said bar-like light source; and
a condensation controlling portion having condensing action to omnidirectionally condense light supplied directly from said bar-like light source or via said reflector.

2. A flash apparatus capable of varying the emission angle, comprising at least a bar-like light source located in a reflector and a light controller located in front of said reflector, and being capable of varying the light emission angle by changing the relative distance between said reflector having said bar-like light source and said light controller or the position of said bar-like light source with respect to said reflector, and wherein said light controller comprises:
a diffusion controlling portion comprising a concave cylindrical lens formed on an opposing face to the bar-like light source in a direction perpendicular to the longitudinal direction of said bar-like light source which has light diffusive action only with respect to the longitudinal direction of said bar-like light source; and
a condensation controlling portion or a Fresnel lens, formed on the other face as a ring-zonal lens having at least one vertex and formed by dividing a curved face of a lens into a plurality of concentric curved face portions and connecting said divided curved face portions together to each other at respective sections which has condensing action to omnidirectionally condense light supplied directly from said bar-like light source or via said reflector.

3. A flash apparatus capable of varying the emission angle as claimed in claim 2, wherein the ring-zonal lens comprises a first condensation controlling portion and a second condensation controlling portion which are formed to be symmetrical with respect to a fiducial line which is across the center of the longitudinal length of the bar-like light source so as to be perpendicular to the longitudinal direction, each condensation controlling portion having one vertex and a ring-zonal lens curved face connected to the vertex, said vertexes being disposed so as to have a distance therebetween of ½ or less of the size of the aperture in the longitudinal direction of said reflector when a wide-angle photograph is taken with said apparatus.

4. A flash apparatus capable of varying the emission angle, comprising a bar-like light source disposed in a reflector and light controller disposed in front of said reflector, and being capable of varying the light emission angle by changing the relative distance between said reflector provided with said bar-like light source and said light controller or the position of said bar-like light source with respect to said reflector, said apparatus being characterized in that said light controller comprises:
a first light controlling member provided in front of the reflector from the side of the bar-like light source and a second light controlling member which is provided in front of the first light controlling member;
said first light controlling member being composed of a first concave cylindrical lens formed on an opposing face to the bar-like light source in the longitudinal direction of said bar-like light source and having light diffusive action with respect to a direction perpendicular to the longitudinal direction of the bar-like light source, and a Fresnel lens provided with a ring-zonal lens formed on the other face, having at least one vertex and having condensing action to omnidirectionally condense light supplied directly from the bar-like light source or via the reflector, said ring-zonal lens being formed by dividing a curved face of a lens into a plurality of concentric curved face portions and connecting said divided curved face portions together to each other at respective sections;

said second light controlling member being composed of a plate-like member provided with a second concave cylindrical lens formed on an opposing face to the ring-zonal lens in a direction perpendicular to the first, concave cylindrical lens.

5. A flash apparatus capable of varying the emission angle, comprising at least a bar-like light source disposed in a reflector and a light controller disposed in front of said reflector, and being capable of varying the light emission angle by changing the relative distance between said reflector provided with said bar-like light source and said light controller or the position of said bar-like light source with respect to said reflector and, at the same time, by changing the size of an aperture of said reflector in the longitudinal direction of said bar-like light source to be narrower when said bar-like light source and said light controller approach to each other, said apparatus being characterized in that said light controller is composed of:
a concave cylindrical lens formed on an opposing face to the bar-like light source in a direction perpendicular to the longitudinal direction of said bar-like light source and having light diffusive action only with respect to the longitudinal direction of said bar-like light source; and
a Fresnel lens provided with
a ring-zonal lens formed on the other face, having at least one vertex and having condensing action to omnidirectionally condense light supplied directly from the bar-like light source or via the reflector, said ring-zonal lens being formed by dividing a curved face of a lens into a plurality of concentric curved face portions and connecting said divided curved face portions together to each other at respective sections, and
a condensing lens formed in such a manner as not to cover the narrowed aperture of the reflector and having condensing action with respect to the longitudinal direction of the bar-like light source.

6. A flash apparatus capable of varying the emission angle, comprising a bar-like light source disposed in a reflector and a light controller disposed in front of said reflector, and being capable of varying the light emission angle by changing the relative distance between said reflector provided with said bar-like light source and said light controller or the position of said bar-like light source with respect to said reflector and, at the same time, by changing the size of an aperture of said reflector in the longitudinal direction of said bar-like light source to be narrower when said bar-like light source and a Fresnel lens approach to each other, said apparatus being characterized in that said light controller comprises:
a first light controlling member provided in front of the reflector from the side of the bar-like light source and a second light controlling member which is provided in front of the first light controlling member;
said first light controlling member being composed of a first concave cylindrical lens formed on an opposing face to the bar-like light source in the longitudinal direction of said bar-like light source and having light diffusive action with respect to a direction perpendicular to the longitudinal direction of the bar-like light source, and
a Fresnel lens provided with a ring-zonal lens formed on the other face, having at least one vertex and having condensing action to omnidirectionally condense light supplied directly from the bar-like light source or via the reflector, said ring-zonal lens being formed by dividing a curved face of a lens into a plurality of concentric curved face portions and connecting said divided curved face portions together to each other at respective sections;

said second light controlling member being composed of a plate-like optical member provided with
a second concave cylindrical lens formed on an opposing face to the ring-zonal lens in a direction perpendicular to the first concave cylindrical lens, and
a condensing lens formed on the other face in such a manner as not to cover the narrowed aperture of the reflector and having condensing action with respect to the longitudinal direction of the bar-like light source.

7. A flash apparatus capable of varying the emission angle as claimed in claim 4, wherein
the ring-zonal lens comprises a first condensation controlling portion and a second condensation controlling portion which are formed to be symmetrical with respect to a fiducial line which is across the center of the longitudinal length of the bar-like light source so as to be perpendicular to the longitudinal direction, each condensation controlling portion having one vertex and a ring-zonal lens curved face connected to the vertex, said vertexes being disposed to have a distance therebetween of ½ or less of the size of the aperture in the longitudinal direction of said reflector when a wide-angle photograph is taken with said apparatus.

8. A flash apparatus capable of varying the emission angle as claimed in claim 5, wherein
the condensing lens comprises a strip-like lens formed by dividing a curved face of a lens having condensing action only with respect to the longitudinal direction of the bar-like light source into a plurality of curved face portions in the direction perpendicular to the longitudinal direction of said bar-like light source and by connecting said divided curved face portions together to each other at respective sections.

9. A flash apparatus capable of varying the emission angle as claimed in claim 6, wherein the condensing lens comprises a strip-like lens formed by dividing a curved face of a lens having condensing action only with respect to the longitudinal direction of the bar-like light source into a plurality of curved face portions in the direction perpendicular to the longitudinal direction of said bar-like light source and by connecting said divided curved face portions together to each other at respective sections.

10. A flash apparatus capable of varying the emission angle as claimed in claim 6, wherein the ring-zonal lens comprises a first condensation controlling portion and a second condensation controlling portion which are formed to be symmetrical with respect to a fiducial line which is across the center of the longitudinal length of the bar-like light source so as to be perpendicular to the longitudinal direction, each condensation controlling portion having one vertex and a ring-zonal lens curved face connected to the vertex, said vertexes being disposed to have a distance therebetween of ½ or less of less size of the aperture in the longitudinal direction of said reflector when a wide-angle photograph is taken with said apparatus.

11. A flash apparatus capable of varying the emission angle, comprising at least a bar-like light source disposed in a reflector and a light controller disposed in front of said reflector, and being capable of varying the light emission angle by changing the relative distance between said reflector provided with said bar-like light source and said light controller or the position of said bar-like light source with respect to said reflector, said apparatus being characterized in that said light controller comprises:

a diffusion controlling portion comprising a concave cylindrical lens having light diffusive action only with respect to the longitudinal direction of said bar-like light source; and a condensation controlling portion having condensing action to omnidirectionally condense light supplied directly from said bar-like light source or via said reflector.

* * * * *